United States Patent
Iwasa et al.

(10) Patent No.: US 7,173,068 B2
(45) Date of Patent: Feb. 6, 2007

(54) THERMOPLASTIC FOAM AND METHOD FOR PRODUCTION THEREOF

(75) Inventors: Koichiro Iwasa, Kyoto (JP); Hiroki Erami, Kyoto (JP); Naoki Ueda, Kyoto (JP); Koichi Shibayama, Osaka (JP); Juichi Fukatani, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 98 days.

(21) Appl. No.: 10/918,552

(22) Filed: Aug. 16, 2004

(65) Prior Publication Data

US 2005/0020704 A1    Jan. 27, 2005

Related U.S. Application Data

(62) Division of application No. 10/048,457, filed as application No. PCT/JP00/05281 on Aug. 7, 2000, now Pat. No. 6,906,119.

(30) Foreign Application Priority Data

| | | | |
|---|---|---|---|
| Aug. 9, 1999 | (JP) | | 1999-225412 |
| Oct. 27, 1999 | (JP) | | 1999-305881 |
| Feb. 3, 2000 | (JP) | | 2000-026663 |

(51) Int. Cl.
*C08J 9/32* (2006.01)

(52) U.S. Cl. .......................... 521/54; 521/91; 521/122; 523/218

(58) Field of Classification Search ................ 521/54, 521/91, 122; 523/218
See application file for complete search history.

(56) References Cited

FOREIGN PATENT DOCUMENTS

| | | | |
|---|---|---|---|
| JP | 08-143697 | * | 6/1996 |
| JP | 10-182141 | * | 7/1998 |

* cited by examiner

*Primary Examiner*—Irina S. Zemel
(74) *Attorney, Agent, or Firm*—Townsend & Banta

(57) ABSTRACT

A thermoplastic foam is provided which contains a thermoplastic resin and a layered silicate and in which foam cells and the layered silicate are evenly and finely dispersed.

A volume-expansible gas or heat decomposable blowing agent is incorporated into interlayer spaces of a layered silicate in a composite material containing 100 parts by weight of a thermoplastic resin and 0.1–50 parts by weight of the layered silicate, and the gas or blowing agent is allowed to expand in volume or thermally decompose to form foam cells 6, so that a thermoplastic foam is obtained in which the layered silicate has an average interlayer spacing of over 60 Å when determined by an X-ray diffractometry.

7 Claims, 6 Drawing Sheets

ION EXCHANGABLE CATION ($Na^+$ OR THE LIKE)

○ : OXYGEN  ◯ : HYDROXYL GROUP
● : ALUMINUM, IRON, MAGNESIUM, OR THE LIKE
· AND • : SILICONE, ALUMINUM, OR THE LIKE

THERMOPLASTIC FOAM AND METHOD FOR PRODUCTION THEREOF

This application is a division of application Ser. No. 10/048,457, filed on Jun. 20, 2002, now U.S. Pat. No. 6,906,119, which is a national stage application of PCT/JP00/05281, filed Aug. 7, 2000.

TECHNICAL FIELD

The present invention relates to a thermoplastic foam which contains a thermoplastic resin and a layered silicate and has uniformly fine foam cells evenly distributed therein and also to a method for production thereof.

BACKGROUND ART

Dispersion of a layer silicate in thermoplastic resins is known to improve their mechanical, thermal, gas barrier or other properties. In the layered silicate constituting clay minerals, extremely fine, flaky crystals are held together by ionic bonding. The above-described properties of thermoplastic reins can be improved by disintegrating this aggregate structure by a chemical or physical means to thereby evenly disperse the flaky crystals throughout the thermoplastic resins.

For example, Japanese Patent Publication No. Hei 8-22946 discloses that a polyamide resin structure containing evenly-dispersed flakes of a layered silicate can be formed by intercalating aminocarboxylic acid into the layered silicate to initially enlarge spacings between adjacent layers, then inserting ε-caprolactam, which is a monomeric moiety of polyamide, into interlayer spaces and concurrently allowing it to undergo polycondensation.

However, in general, it is extremely difficult to achieve uniform dispersion of the layer silicate in a matrix of a polymer if it is disimilar to polyamide and its monomer can not be inserted into interlayer spaces of the layered silicate. Various attempts have been made to solve this problem.

For example, Japanese Patent Laying-Open No. Hei 9-183910 discloses a method for dispersing a layered silicate in a polymer by mixing, in a molten state, an organic dispersion incorporating an organically-modified layered silicate swelled and dispersed therein with a vinyl polymer compound. Japanese Patent Laying-Open No. Hei 10-182892 discloses that melt neading of an organically-modified layered silicate, a polyolefin oligomer containing a hydrogen-linkable functional group and a polyolefin polymer results in the preparation of a polyolefinic resin composite material in which a spacing between adjacent layers of the layered silicate is infinitely swelled in the polymer.

Meanwhile, resins have been conventionally used in the form of foams to reduce the weight or cost of the resins or to provide decorative appearances thereto. Incorporation of inorganic fillers in such foams has also been conventional to improve mechanical strength, heat insulation performance, impact absorption performance of the foams. For example, Japanese Patent Laying-Open No. Hei 8-143697 describes that incorporation of a layered silicate in a polypropylene foam composition results in the improved strength or other physical properties of such a foam.

However, the method described in Japanese Patent Laying-Open No. Hei 9-183910 requires the use of a solvent. The resulting composite material exhibits the insufficient strength, such as in flexural modulus, probably due to the insufficient removal of a residual solvent. Also, the inclusion of complex steps, such as of dissolving a polymer, swelling the organically-modified layered silicate and removing the solvent, makes this prior art impracticable from an industrial point of view.

Also, the material described in Japanese Patent Laying-Open No. Hei 10-182892 as containing the layered silicate in the form of crystalline flakes dispersed evenly in a polymer has been found extremely difficult for practical use as an industrial material.

That is, because a reaction between a functional group in the polyolefin oligomer and a hydroxyl group on a surface of the layered silicate is caused to occur during the melt kneading, the hydroxyl group of the layered silicate is not necessarily treated in an effective manner by the functional group. Accordingly, a large amount of polyolefin oligomer is required to achieve uniform dispersion of the layered silicate in practice. The high loading of such an oligomer component in the polymer is undesirable in terms of physical properties and cost.

Japanese Patent Laying-Open No. Hei 8-143697 discloses that a polypropylene foam composition if including a layered silicate with a blowing agent adsorbed therein provides a polypropylene foam with a high expansion ratio and high strength. However, disintegrating an aggregation structure of the layered silicate and evenly dispersing the resulting flaky crystals in the resin are left out of consideration. The disclosed technique thus fails to obtain a sufficient effect of the loaded layered silicate. Also, a specific blowing agent must be held adsorbed to the layered silicate. The requirement of a multi-stage treatment thus reduces productivity. Further, the use of a silane coupling agent is essential. This increases the cost. The unstable nature of the silane coupling agent which is highly linkable to a moisture in the air reduces handleability.

In view of the problems encountered with the above-described conventional thermoplastic foam compositions each containing a thermoplastic resin and a layered silicate and methods for production thereof, the present invention is directed to provide a thermoplastic foam which comprises a thermoplastic resin and a layered silicate and in which foam cells and layered silicate are evenly and finely dispersed, and also to provide a method for production thereof.

DISCLOSURE OF THE INVENTION

In accordance with a broad aspect of the present invention, a thermoplastic foam is provided which is characterized as containing, as main components, 100 parts by weight of a thermoplastic resin and 0.1–50 parts by weight of a layered silicate.

In a particular aspect of the present invention, the layered silicate in the thermoplastic foam has an average interlayer spacing of over 60 Å when determined by X-ray diffractometry.

In another particular aspect of the present invention, $X/(Y-1)^{1/3}$ does not exceed 30 (μm), where X (μm) is an average cell diameter and Y is an expansion ratio.

In a further particular aspect of the present invention, a polyolefin resin is used for the theremoplastic resin.

In a further particular aspect of the present invention, at least one selected from smectite clay minerals and micas is used for the layered silicate.

In a further particular aspect of the present invention, at least one selected from the group consisting of polyethylene, ethylene-α-olefin copolymer, ethylene-propylene copolymer, polypropylene and propylene-α-olefin copolymer is used for the polyolefin resin.

In a broad aspect of the method for production of a thermoplastic foam in accordance with the present invention, the method includes the steps of impregnating a volume-expansible chemical substance into interlayer spaces of a layered silicate in a composite material which contains 100 parts by weight of a thermoplastic resin and 0.1–50 parts by weight of the layered silicate, and allowing the chemical substance to expand in volume within the composite material for formation of cells therein so that a thermoplastic foam is obtained.

In a particular aspect of the production method, the step of impregnating the chemical substance is performed by impregnating, under a high pressure, the chemical substance that assumes a gaseous form at ordinary temperature and pressure. Also, the expansion in volume of the chemical substance is effected by vaporizing it within the composite material.

In another particular aspect of the production method in accordance with the present invention, the chemical substance that assumes a gaseous form at ordinary temperature and pressure is in its supercritical state impregnated into the composite material.

In a further broad aspect of the production method of the present invention, a method for production of a thermoplastic foam is provided which is characterized as including the steps of preparing a composite material which comprises 100 parts by weight of a thermoplastic resin and 0.1–50 parts by weight of a layered silicate that contains a heat decomposable blowing agent between its layers, and heating the composite material to a temperature sufficiently high to cause decomposition of the blowing agent so that a cell structure is formed.

In a further broad aspect of the production method in accordance with the present invention, the method is provided including the steps of impregnating an expansible chemical substance into a thermoplastic resin composition which contains 100 parts by weight of a thermoplastic resin and 0.1–50 parts by weight of a layered silicate under a high pressure within an injection molding machine having a cavity and, subsequent to injection of the thermoplastic resin composition impregnated with the chemical substance into the cavity of the injection molding machine, allowing the cavity to enlarge.

In a particular aspect of the production method, the chemical substance that assumes a gaseous form at ordinary temperature and pressure is in its supercritical state impregnated into the thermoplastic resin composition within the injection molding machine.

Also in the production method, the layered silicate is preferably treated so as to render its interlayer spaces hydrophobic.

Details of the present invention are given below.

In the present invention, it is most noticeable that a fine cell structure can be readily formed by allowing the chemical substance present in the interlayer spaces of the layered silicate to expand in volume within a resin so that flaky crystals of the layered silicate are evenly dispersed in an organic polymer.

The mechanism involved in the present invention is now desribed in detail.

As schematically shown in FIG. 1 and FIG. 2, flaky crystals 2, 3 of a layered silicate 1, e.g., montmorillonite shown in FIG. 1, are generally constituted by tetrahedrons with four oxygen ions arranged to surround a central silicon or other ion, octahedrons with six oxygen ions arranged to surround a central aluminum or other ion, and OH groups.

A sodium, calcium or other cation arranged on a crystal surface (B) binds such flaky crystals 2, 3 by ionic bonding.

Since the sodium, calucium or other ion on the crystal surface (B) is generally ion-exchangeable with a cationic material, the insertion of various cationic materials into interlayer spaces is enabled. Utilizing this nature, the above-identified ion can be ion-exchanged with a cationic surfactant. The use of a highly nonpolar cationic species for the cationic surfactant lowers the polarity of the layered silicate (B) to thereby facilitate dispersion of the layered silicate in a nonpolar polymer.

Also, if such flakes of the layered silicate are to be dispersed, the flaky crystals 2, 3 must be spaced away from each other by applying to interlayer spaces such an energy that counteracts or lowers an electrical interaction between the crystal surfaces (B).

To this end, the present invention involves subjecting a composite material comprising a thermoplastic resin and a layered silicate to a treatment whereby a volume-expansible chemical substance is inserted into the interlayer spaces of the layered silicate, or alternatively, a heat decomposable substance is incorporated in the interlayer spaces of the layered silicate. The subsequent expansion in volume of the chemical substance or thermal decomposition of the heat decomposable blowing agent provides an energy sufficient to separate the flaky crystals from each other.

Also in accordance with the present invention, while the chemical substance that assumes a gaseous form, or a gas released via decomposition of the heat decomposable blowing agent expands within the composite material comprising the thermoplastic resin and the layered silicate 5, the flaky crystals 5A act as barriers, as schematically shown in FIG. 3. This suppresses excessive diffusion of the gas through molecular chains 4 of the thermoplastic resin. As a consequence, a foam is obtained including foam cells 6 finely and evenly dispersed therein. The suppression of excessive diffusion of the gas results in the reduced occurrnece of gas escaping. A higher expansion ratio can be obtained as a consequence.

Conventionally, various measures, e.g., size reduction of a blowing agent or loading of a minute additive serving as a nucleus of expansion, have been taken in the production of foams to suppress the reduction in strength thereof that may result from a marked size increase of foam cells. However, the present invention provides fine and uniform foam cells in a simple manner by a technique that is totally different from such conventional ones.

Preferably, the thermoplastic foam in accordance with the present invention has an expansion ratio Y in the range of 1.01–100. Within this range of expansion ratio Y, an average cell diameter X (μm) of the thermoplastic foam preferably satisfies the following relationship (1).

$$\text{Average cell diameter } X/(\text{expansion ratio } Y-1)^{1/3} \leq 30 \tag{1}$$

If a numerical value calculated from a left side of the relationship (1) exceeds 30, the reduction in physical properties of the thermoplastic foam, such as in insulation performance, compressive strength or bending creep, may result.

In the present invention, the layered silicate refers to a silicate mineral which has plural layers comprised of a number of fine flaky crystals and incorporates exchangeable cations between its layers. The flaky crystal generally has a thickness of about 1 nm and a ratio (hereinafter referred to as an aspect ratio) of a major diameter to the thickness in the approximate range of 20–200. In the layered silicate, these fine flaky crystals are held together by ionic bonding.

The above-described layered silicate incorporating exchangeable cations between its layers is not particularly specified in type. Examples of such layered silicates include smectite clay minerals such as montmorillonite, saponite, hectorite, beidellite, stevensite and nontronite; natural micas such as vermiculite and halloysite; synthetic micas such as swelling mica (swelling mica); and the like. Such layered silicates, either synthetic or natural, can be suitably used. The use of swelling smectite clay minerals and swelling micas are preferred.

The above-listed layered silicates may be used alone or in combination.

In the present invention, the babble growth and gas escaping are suppressed by the barrier action of the flaky crystals of the layered silicate. The use of the layered silicate which includes agglomerates of high-aspect ratio flaky crystals thus results in the formation of a fine foam cell structure with a high expansion ratio. For this reason, the use of the layered silicate having flaky crystals with an aspect ratio of 100 or above is preferred. Particularly, the use of montmorillonite including flaky crystals with an aspect ratio of about 100 or above, or swelling mica including flaky crystals with an aspect ratio of about 150 is more preferred.

Preferably, the interlayer spaces of the layered silicate are rendered hydrophobic. Particularly when a nonpolar resin such as a polyolefin resin is used for the thermoplastic resin, it is preferred to hydrophobicize the interlayer spaces because the layered silicate has a high affinity for such a thermoplastic resin.

The following techniques (1)–(3) can be utilized to hydrophobicize the interlayer spaces.

(1) Ion-exchange of exchangeable cations present in the interlayer spaces of the layered silicate with a cationic surfactant In general, the exchangeable cations present in the interlayer spaces (i.e., on surfaces of the flaky crystals) are ions such as of sodium or calcium. These ions are ion-exchangeable with exchanging cations of the cationic surfactant. It accordingly becomes possible to insert various cationic surfactants having exchanging cations into the interlayer spaces.

Thus, the ion exchange of the exchangeable cations for the exchanging ions of a low-polarity cationic surfactant renders crystal surfaces of the layered silicate less polar or nonpolar, resulting in the increased dispersion of the layered silicate in a nonpolar resin.

As stated earlier, in general, exchangeable cations are ions of alkali metals or alkaline-earth metals, such as sodium or calcium. The useful exchanging cation is an ion which is more base than or comparable to the exchangeable cation.

In the case where an ion is used which is comparable to the exchangeable cation, the concentration of the exchanging ions may be made higher than that of the exchangeable cations.

(2) Chemical modification of hydroxyl groups present on the crystal surfaces of the layered silicate by a compound having at its molecular terminal a functional group having a tendency to couple chemically to the hydroxyl group or a chemical affinity for the hydroxyl group and/or a reactive functional group (3) Chemical modification of the crystal surfaces of the layered silicate by a compound which contains at least one reactive functional group, other than an anionic site present in its molecular chain, and which takes the form of an anionic surface active agent and/or a reagent capable of anionic surface activation The preceding techniques (1)–(3) may be utilized alone or in any combination thereof.

The hydrophobicized layered silicate is suitably used because it shows the increased dispersion in a nonpolar or low-polarity resin such as a polyolefin resin than before being hydrophobicized.

The cationic surfactant is not particularly specified in type and may be selected from generally-used cationic surfactant. Examples cationic surfactants include those comprised chiefly of quaternary ammonium salts, quaternary phosphonium salts and the like. The use of quaternary ammonium salts having an alkyl chain with 8 or more carbon atoms is preferred. Without the inclusion of an alkyl chain of 8 or more carbon atoms, the strong hydrophilicity of alkyl ammonium ions may prevent the interlayer spaces of the layered silicate from being rendered nonpolar or less polar to a sufficient extent.

Examples of quaternary ammonium salts include lauryl trimethyl ammonium salt, stearyl trimethyl ammonium salt, trioctyl ammonium salt, distearyl dimethyl ammonium salt, di-cured tallow dimethyl ammonium, distearyl dibenzyl ammonium salt and the like.

While not particularly specified, the cation exchange capacity of the layered silicate is preferably 50–200 milliequivalents/100 g. If it is excessively low, a smaller amount of a cationic surfactant may be intercalated, via ion exchange, between crystal layers to possibly result in the insufficient hydrophobicization of the interlayer spaces. On the other hand, if it is excessively high, the adjacent layers of the layered silicate may be bound more tightly to each other to result in the difficulty to delaminate (separate) crystal flakes.

The flaky crystals of the layered silicate serve as barriers to suppress growth of bubbles during evolution thereof. Accordingly, the excessive low loading of the layered silicate may result in the failure to obtain a foam having a fine foam cell structure. The excessive high loading thereof may result in the reduced bending strength and the increased production cost. In view thereof, the layered silicate is preferably loaded in the range of 0.1–50 parts by weight, more preferably in the range of 2–10 parts by weight, based on 100 parts by weight of the thermoplastic resin.

To obtain a more uniform thermoplastic foam using a layered silicate, the layered silicate when dispersed in the thermoplastic resin preferably has an average interlayer spacing (interlayer distance of a (001) plane of the layered silicate when determined by X-ray diffractometry) of over 60 Å.

The type of the thermoplastic resin is not particularly specified. The preferred examples of useful thermoplastic resins include polyolefin resins, EVA resins, polystyrene resins, vinyl chloride resins, ABS resins, polyvinyl butyral resins and various rubbers. The use of crystalline resins such as polyolefin resins is more preferred.

Due to the presence of crystal sites, the crystalline resin in an unmolten state shows a high shape-retaining effect. The crystalline resin is thus easier to retain a shape of a foam during expansion in volume of the below-stated chemical substance in a composite material comprising the thermoplastic resin and the layered silicate.

The polyolefin resin for use in the present invention is not particularly specified in type, examples of which include a homopolymer of ethylene, propylene or α-olefin; a copolymer of ethylene and propylene, a copolymer of ethylene and α-olefin, a compolymer of propylene and α-olefin, a copolymer of two or more α-olefins and the like. Examples of α-olefins include 1-butene, 1-pentene, 1-hexene, 4-methyl-1-pentene, 1-heptene, 1-octene and the like.

These polyolefin resins may be used alone or in any combination thereof.

The molecular weight and molecular weigh distribution of the polyolefin resin is not particularly specified. Its weight average molecular weight is preferably in the range of 5,000–5,000,000, more preferably in the range of 20,000–300,000. Its molecular weight distribution (weight average molecular weight Mw/number average molecular weight Mn) is preferably in the range of 2–80, more preferably in the range of 3–40.

Other types of polymer compounds, if appropriate, may be alloyed or blended with the thermoplastic resin. For example, a polymer compound incorporating a grafted maleic or other carboxylic acid may be added in a small amount to increase in advance an affinity between the thermoplastic resin and the layered silicate.

When necessary, suitable additives may be added to the polyolefinic resin to impart desired physical properties thereto. Examples of such additives include an antioxidant, light stabilizer, UV absorber, lubricant, flame retardant antistatic agent and the like. A substance serviceable as a crystal nucleating agent can also be added in a small amount to finely divide crystals so that the uniformity of physical properties is enhanced.

Where the thermoplastic resin is a crystalline resin, any arbitrary organic or inorganic gas which exists in a gaseous state within the range from (melting point −20° C.) to (melting point +20° C.) can be used as the chemical substance for insertion into the interlayer spaces of the layered silicate used. Where the thermoplastic resin is a noncrystalline resin, any arbitrary organic or inorganic gas which exists in a gaseous state within the range from (glass transition point −20° C.) to (glass transition point +20° C.) can be used as the chemical substance for insertion into the interlayer spaces of the layered silicate used. Examples of suitable gases include carbon dioxide (carbonic acid gas), nitrogen, oxygen, argon or water; organic gases such as flon, low-molecular weight hydrocarbons, chlorinated aliphatic hydrocarbons, alcohols, benzene, toluene, xylene, mesitylene; or the like. In particular, a gas is suitably used which assumes a gaseous form at ordinary temperature (23° C.) and pressure (atmospheric pressure).

Examples of low-molecular weight hydrocarbons include pentane, butane and hexane. Examples of chlorinated aliphatic hydrocarbons include methyl chloride and methylene chloride. Also useful are various fluorinated aliphatic hydrocarbons.

Carbon dioxide is suitable for use as the chemical substance because it eliminates the need of gas recovery and is safe to handle. Carbon dioxide can be changed to a supercritical state at relatively low temperature and pressure and, while in the form of a supercritical fluid, acts in an effective manner to promote dispersion of the layered silicate. The supercritical state refers to a state in which temperature and pressure are above a critical point of the chemical substance to be impregnated. In the super-critical state, the chemical substance has no vapor-liquid transition. The supercritical fluid exhibits properties intermediate between the gas and the liquid, such as a high thermal conductivity, low diffusion rate and low viscosity. Accordingly, the supercritical fluid is suited in dispersing the layered silicate.

The chemical substance may take a liquid form at ordinary temperature. Examples of such chemical substances include saturated hydrocarbons such as pentane, neopentane, hexane and heptane; chlorine compounds such as methylene chloride, trichloroethylene and dichloroethane; and fluorine compounds such as CFC-11, CFC-12, CFC-13 and CFC-141b.

Various techniques can be utilized to impregnate the chemical substance into the interlayer spaces of the layered silicate incorporated, together with the thermoplastic resin, in the composite material. An illustrative technique involves introducing, in the form of a gas, the chemical substance in a closed autoclave for subsequent pressurizing. Using this technique, the pressure and temperature can be readily controlled.

Another technique involves loading the thermoplastic resin in a melt extruder with a vented screw and supplying the gas from a middle portion of a cylinder to a vent portion. In this instance, if the resin while in a molten state is pressure sealed, the chemical substance can be impregnated in a more effective manner into the composite material containing the thermoplastic resin and the layered silicate to insure continuous production of thermoplastic foams.

In the case of using a gas for the chemical substance that assumes a gaseous form at ordinary temperature and pressure, when the chemical substance is impregnated into the composite material containing the thermoplastic resin and layered silicate, such a gas is preferably maintained at a pressure of $9.8 \times 10^5$ Pa or above, more preferably $9.8 \times 10^6$ Pa or above.

The conditions required to change the gas that assumes a gaseous form at ordinary temperature and pressure, as the chemical substance, to a supercritical fluid vary depending upon the type of the chemical substance used. As described above, carbon dioxide shows a supercritical property under relatively gentle conditions and can be changed to a supercritical fluid at 60° C. and 60 atmospheric pressure, for example.

No particular limitation is given to the temperature at which the chemical substance is impregnated into the composite material containing the thermoplastic resin and layered silicate, unless it causes deterioration of the composite material. However, at higher temperatures, a larger amount of the chemical substance dissolves in the composite material containing the thermoplastic resin and layered silicate to result in obtaining a higher expansion ratio. Accordingly, the higher impregnation temperature is preferred. In order to establish a satisfactory foaming environment, it is more preferred that the temperature is maintained within the range from (melting point −20° C.) to (melting point +20° C.), if a crystalline resin is used for the thermoplastic resin, or within the range from (glass transition point −20° C.) to (glass transition point +20° C.) if a noncrystalline resin is used for the thermoplastic resin.

If the impregnation temperature of the chemical substance is higher than (melting or glass transition point +20° C.), a molecular motion of the thermoplastic resin becomes active to result in the increased tendency of the chemical substance once dissolved in the composite material to escape therefrom. On the other hand, if the impregnation temperature of the chemical substance is lower than the melting or glass transition point, the molecular motion of the thermoplastic resin becomes insufficient and in some cases prevents the sufficient dissolution of the chemical substance in the composite material.

The thermoplastic foam in accordance with the present invention is produced by impregnating the aforementioned chemical substance into the composite material containing the thermoplastic resin and the layered silicate and then allowing the chemical substance to expand in the composite material. The technique used to effect expansion in volume of the chemical substance is suitably chosen depending upon the type of the chemical substance used, and may comprise impregnating the chemical substance in the form of a gas into the composite material under a relative high pressure, and then reducing the pressure or applying heat.

The temperature at which the chemical substance is caused to expand in volume within the composite material is not particularly specified. Preferably, the temperature is maintained within the range from (melting point −50° C.) to (melting point +10° C.) if the thermoplastic resin is a crystalline resin or within the range from (glass transition point −50° C.) to (glass transition point +50° C.) if the thermoplastic resin is a noncrystalline resin. That is, if the temperature of volume expansion is higher than (melting point +10° C.) or (glass transition point +50° C.), the gas once dissolved is allowed to escape readily, resulting in the difficulty to sustain a desired cell structure. On the other hand, if the temperature of volume expansion is below (melting or glass transition point −50° C.), a molecular motion of the thermoplastic resin is restricted to result in the failure to obtain a high expansion ratio.

As stated earlier, in a broad aspect of the present invention, a foam structure is obtained by impregnating a chemical substance that assumes a gaseous form at ordinary temperature and pressure into a thermoplastic resin composition containing 100 parts by weight of a thermo-plastic resin and 0.1–50 parts by weight of a layered silicate under a high pressure within an injection molding machine having a cavity, injecting the thermoplastic resin composition impregnated with the chemical substance into the cavity of the injection molding machine, and then enlarging the cavity. The useful examples of thermoplastic resins, layered silicates and gases that assume a gaseous form at ordinary temperature and pressure were previously listed. However, the use of carbon dioxide is preferred because it eliminates the need of gas recovery and is safe to handle.

The above-described technique can also be utilized here to impregnate the chemical substance under a high pressure within the injection molding machine.

The thermoplastic resin composition impregnated with the chemical substance is injected into the mold cavity of the injection molding machine, followed by enlargement of the cavity.

Preferably, the cavity is enlarged in a direction perpendicular to a parting plane of an injection mold by simply moving a moveable mold half backward. However, the cavity may be enlarged in a direction parallel to the parting plane as by using a slide core, if the occasion permits.

The size of the cavity after being enlarged is suitably adjusted depending upon the desired expansion ratio of the end foam. If the size is excessively small, the enlargement results in the failure to impart properties (light weight, heat insulating or other properties) needed for foams. On the other hand, if the size is excessively large, the cavity after enlargement may be insufficiently filled with the thermoplastic resin composition to result in the failure to impart the desired expansion ratio and shape of the end foam. Accordingly, the cavity is preferably enlarged to 2–30 times of its size before being enlarged.

The time required to enlarge the cavity may be varied depending upon the desired expansion ratio and shape of the resulting foam and upon the particular tensile viscosity of the thermoplastic resin composition used. Although the means for enlarging the cavity has its limit, a shorter operation thereof is preferred. This permits expansion of the chemical substance while having a high tensile viscosity and prevents cell breakage, so that a foam having a fine cell structure can be obtained. It is accordingly preferred that the enlargement completes within 0.5–5 seconds.

Preferably, the chemical substance is brought to a supercritical state when its impregnation is carried out within the injection molding machine. This further promotes dispersion of the flaky crystals of the layered silicate.

As stated above, the thermoplastic resin composition impregnated with the chemical substance is first injected into the cavity. When the cavity is subsequently enlarged, the pressure within the cavity is rapidly released. This provides an energy sufficient to overcome an electrical attraction force between the layered silicates. As a result, the flaky crystals of the layered silicate can be separated from each other. As also stated above, in the case where the chemical substance while in a supercritical fluid state has been impregnated into the thermoplastic resin composition, the subsequent enlargement of the cavity causes the chemical substance to undergo a rapid change to a gaseous state. In this instance, the change of the chemical substance from the supercritical state to the gaseous state is accompanied by rapid and large volume expansion. This provides an energy sufficient to separate the flaky crystals of the layered silicate and thus further promotes dispersion of the flaky crystals.

One embodiment of the production method of the present invention in which the enlargement of the cavity results in the formation of a cell structure is now described with reference to FIGS. 4–6.

FIG. 4 is a sectional view, illustrating one example of an injection molding machine for use in this embodiment.

In FIG. 4, reference numerals 11, 12 and 16 represent an injection molding machine, an injection mold and a vent portion, respectively.

As shown in FIG. 4, the injection molding machine for use in this embodiment includes an injection machine main body 11 and an injection mold 12.

The injection machine main body 11 includes a cylinder 14 with a built-in screw 13, a hopper 15 through which the thermoplastic resin composition is fed into the cylinder 14, and a vent portion 16 through which the chemical substance from a gas forcing device 61 is introduced into the cylinder 14.

FIG. 5 is a sectional view, showing the injection mold, for use in this embodiment, in the condition of being closed by clamping. FIG. 6 is a sectional view, showing an injection mold cavity in the condition of being enlarged.

In FIGS. 5 and 6, reference numerals 12 and 23 denote an injection mold and a mold cavity, respectively.

As shown in FIGS. 5 and 6, the injection mold for use in this embodiment includes a stationary mold half 21 and a movable mold half 22. When clamped, the cavity 23 is defined between the stationary half 21 and the movable half 22.

In this embodiment, the aforementioned thermoplastic resin composition is fed into the hopper 15 shown in FIG. 4, and the chemical substance that assumes a gaseous form at ordinary temperature and pressure is introduced by the gas forcing device 61 into the cylinder 14 through the vent portion 16.

An interior pressure of the cylinder is now increased. Also, the chemical substance is impregnated into the thermoplastic resin composition at a temperature and pressure sufficient to bring the chemical substance to a supercritical state.

In this case, if the thermoplastic resin composition while in a molten state is pressure sealed, the chemical substance while pressurized or in a supercritical state can be impregnated into the thermoplastic resin composition more effectively.

The thermoplastic resin composition 25 impregnated with the chemical substance is then injected into the cavity 23 through a sprue 24 of the injection mold 12.

Subsequently, the movable half 22 of the injection mold 12 is shifted backward, as shown in FIG. 6, to enlarge the cavity 23.

This causes expansion of the thermoplastic resin composition injected into the cavity 23 to result in obtaining a thermoplastic foam.

FIG. 7 FIG. 4 is a sectional view, illustrating another example of an injection molding machine for use in this embodiment.

In FIG. 7, reference numeral 17 denotes an airtight container. As shown in FIG. 7, an injection machine main body 11 includes a cylinder 14 with a built-in screw 13, a hopper 15 through which the thermoplastic resin composition is fed into the cylinder 14, and the airtight container 17 through which the chemical substance from a gas forcing device 70 is introduced into the cylinder 14.

In this embodiment, the aforementioned thermoplastic resin composition is fed into the hopper 15 of the injection machine main body 11 shown in FIG. 7. Then, the chemical substance that takes a gaseous form at ordinary temperature and pressure is forced by the gas forcing device 70 into the airtight container 17, impregnated into the thermoplastic resin composition fed into the hopper 15 either under a high pressure or at a temperature and pressure sufficient to bring the chemical substance to a supercritical state, and injected into the cylinder 14.

If the procedures described with reference to FIGS. 4–6 are followed, a thermoplastic foam can be obtained.

In the aforestated further broad aspect of the present invention, a thermoplastic foam is obtained by preparing a composite material which comprises 100 parts by weight of a thermoplastic resin and 0.1–50 parts by weight of a layered silicate containing a heat decomposable blowing agent between its layers, and heating the composite material to a temperature sufficiently high to cause decomposition of the blowing agent. The types of applicable thermoplastic resins and layered silicates are described above.

The heat decomposable blowing agent, as described above, refers to a substance which decomposes when heated to generate a gas. Examples of such substances include azodicarbonamide, benzene sulfonyl hydrazide, dinitrosopentamethylenetetramine, toluene sulfonyl hydrazide, 4,4-oxybis(benzene sulfonyl hydrazide) and the like.

The technique used to incorporate the heat decomposable blowing agent into the interlayer spaces of the layered silicate is not particularly specified. The following techniques can be employed, for example.

(1) A blowing agent is converted to a quaternary amine by allowing a hydrochloric acid to attack to a terminal amine of the blowing agent. The ion-exchanging in water of the quaternary amine with metal ions previously contained in the interlayer spaces of the layered silicate results in the incorporation of the blowing agent in the interlayer spaces. This technique is suitably used because most general-purpose blowing agents have a terminal amine.

(2) The heat decomposable blowing agent is solvated, in water, with metal ions present in the interlayer spaces of the layered silicate. This technique is also suitably used because, in general, most general-purpose heat decomposable blowing agents include a site, such as nitrogen and a carbon-carbon double bond, which tend to form a coordinate bond with metal ions.

The heat decomposable blowing agent may be incorporated in the interlayer spaces of the layered silicate at any temperature which neither causes deterioration of the composite material nor initiates decomposition of the blowing agent.

The temperature at which the heat decomposable blowing agent is caused to expand in the thermoplastic resin is not particularly specified.

The thermoplastic foam obtained in accordance with the present invention has uniform and fine foam cells as a result of the barrier action of the flaky crystals of the layered silicate. Accordingly, the thermoplastic foam in accordance with the present invention is applicable for various uses. Depending upon the purposes contemplated, suitable changes and modifications may be made to the thermoplastic foam in accordance with the present invention. For example, its expansion ratio is not necessarily required to be high when it is applied for uses where high foam properties are not necessarily required or a reinforcing effect as a result of dispersion of the layered silicate is mainly sought. The thermoplastic foam in accordance with the present invention may be heated or pressed to break cells to use as a solid body. Also, the thermoplastic foam obtained in accordance with the present invention may be used as a master batch for provision in the succeeding fabrication process.

BRIEF DESCRIPTION. OF THE DRAWINGS

BEST MODE FOR CARRYING OUT THE INVENTION

Figure 1:
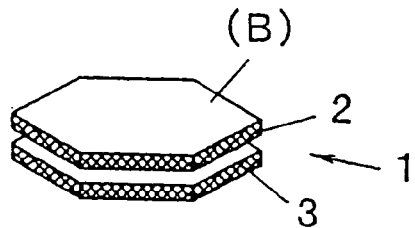
FIG. 1 is a schematic perspective view given to explain a structure of a layered silicate for use in obtaining the thermoplastic foam of the present invention.
Figure 2:
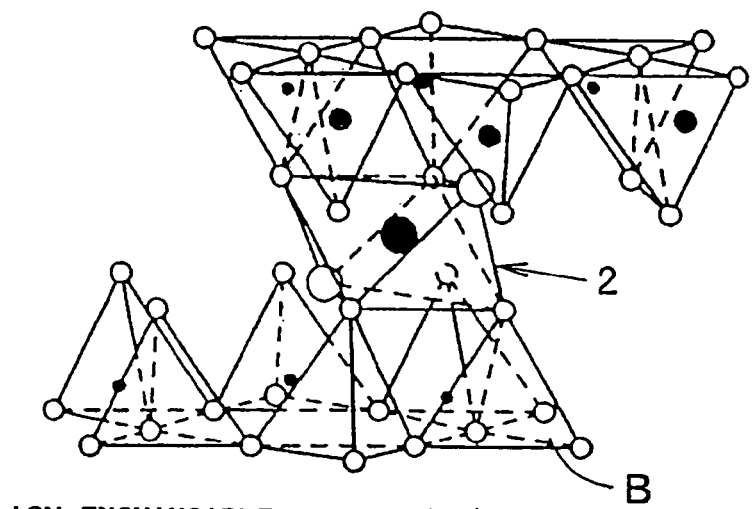
FIG. 2 is an enlarged schematic view which shows a partial structure of the layered silicate shown in FIG. 1 in which crystal surfaces face toward each other.
Figure 2:
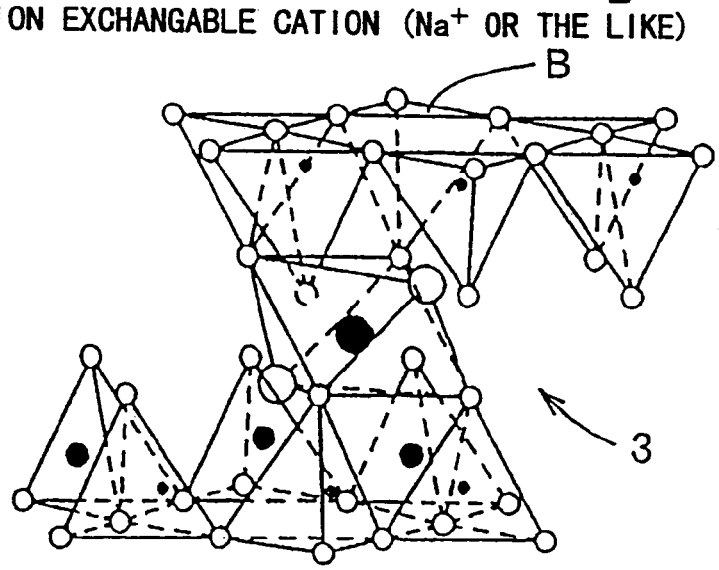
Figure 3:
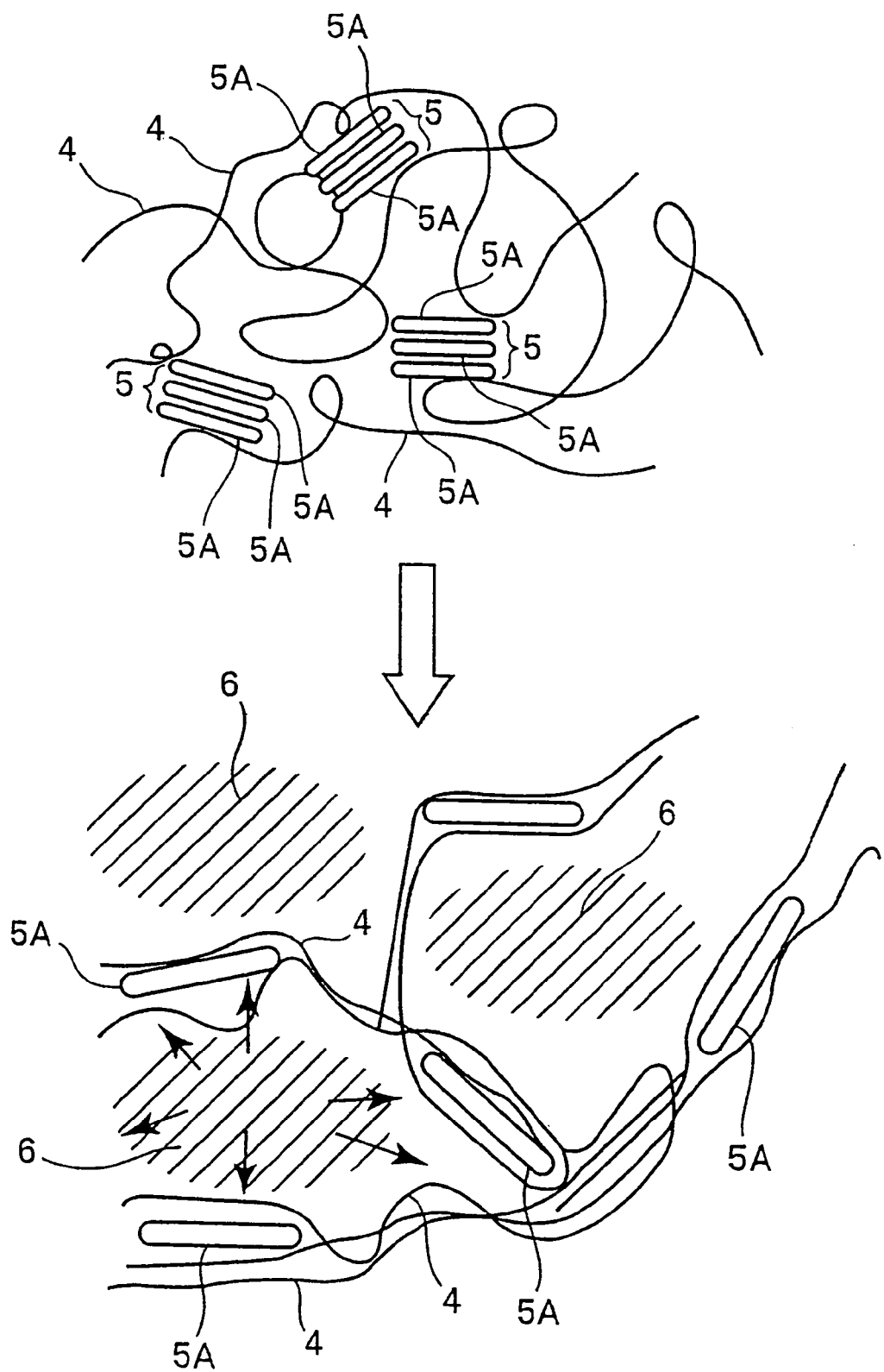
FIG. 3 is a schematic view which shows a model given to explain how the gas diffusion during formation of foam cells is prevented.
Figure 4:
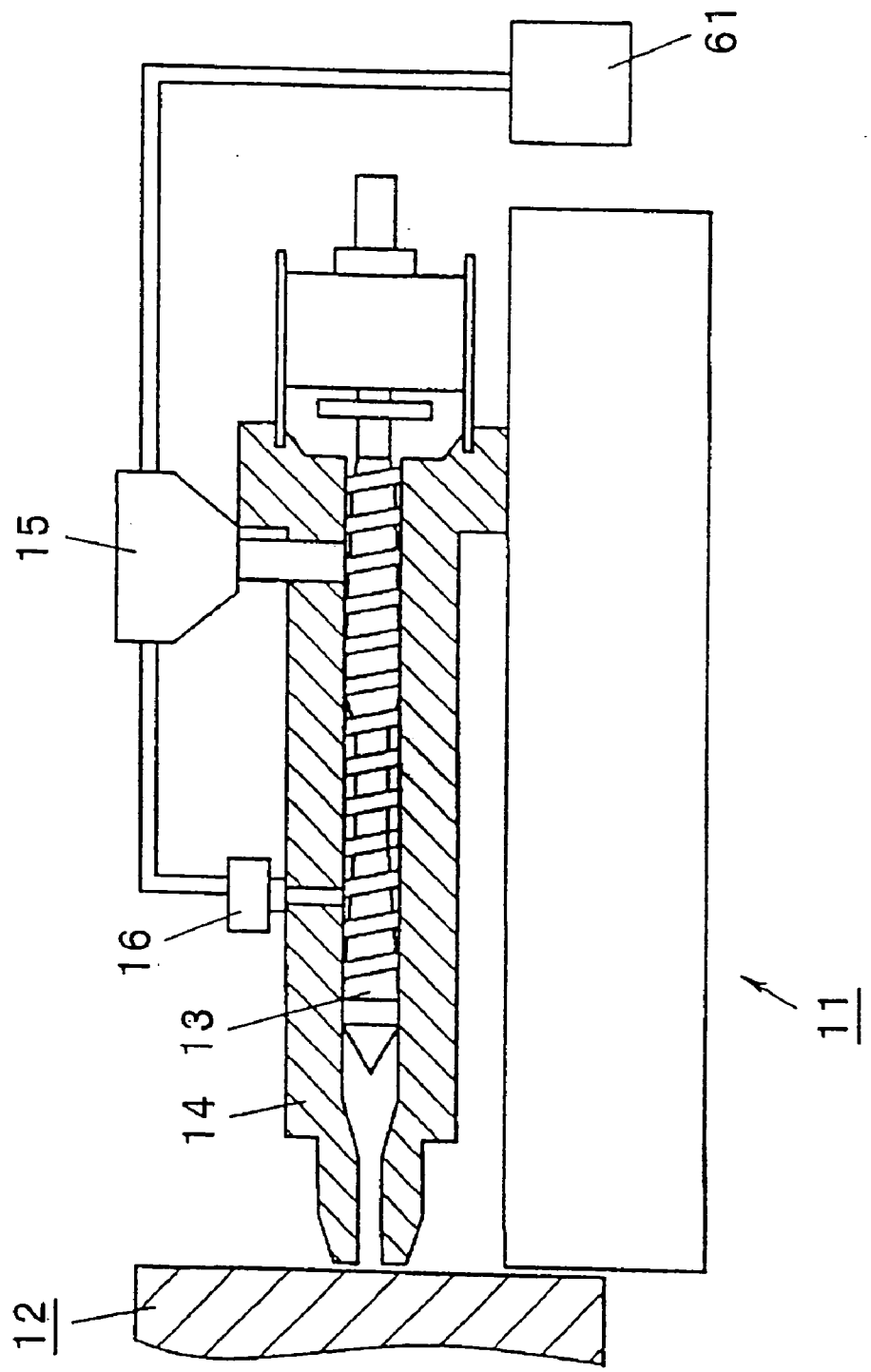
FIG. 4 is a sectional view which shows an injection molding machine for use in one embodiment of the present invention.
Figure 5:
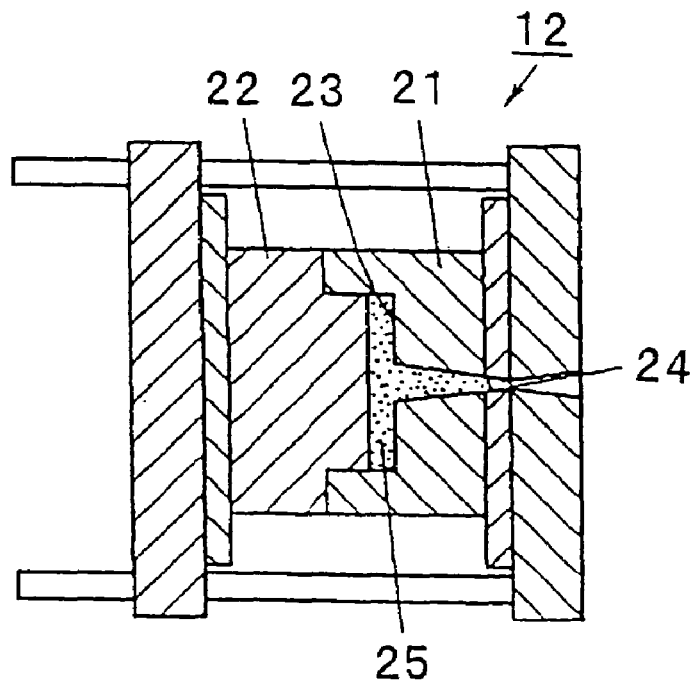
FIG. 5 is a sectional view of an injection mold, for use in one embodiment of the present invention, in the condition of being closed by clamping.

The present invention is below described in more detail with reference to the following non-limiting examples and comparative examples.

(Raw Material)

(a) Layered Silicate

The following minerals were used for the layered silicate.

(1) Montmorillonite: montmorillonite manufactured by Hojun Kogyo Co., Ltd. (product name: Bengel-A)

(2) Swelling mica: swelling mica manufactured by Corp Chemical Co., Ltd. (product name: ME-100)

(b) Layered Silicate Containing a Cationic Surfactant

The following commercial products were used for the layered silicate containing a cationic surfactant.
   (1) DSDM-modified montmorillonite: DSDM-modified montmorillonite manufactured by Hojun Kogyo Co., Ltd. (product name: New S-Ben, organically-modified montmorillonite prepared via total ion-exchange of sodium ions present in interlayer spaces of montmorillonite with distearyl dimethyl ammonium chloride)
   (2) DSDM-modified swelling mica: DSDM-modified swelling mica manufactured by Corp Chemical Co., Ltd. (product name: MAE, organically-modified swelling mica prepared via total ion-exchange of sodium ions present in interlayer spaces with distearyl dimethyl ammonium chloride)

(c) Chemical Substance for Impregnation into a Composite Material

The followings were used for the chemical substance.
   (1) Carbon dioxide (carbonic acid gas)
   (2) Nitrogen
   (3) Pentane
   (4) Xylene
   (5) Water (d) Heat Decomposable Blowing Agent for Insertion into the Interlayer Spaces of the Layered Silicate The followings were used for the heat decomposable blowing agent.
   (1) Azodicarbonamide (product of Eiwa Kasei Co., Ltd.)
   (2) Benzene sulfonyl hydrazide (product of Eiwa Kasei Co., Ltd.)

(e) Thermoplastic Resin
   (1) Polypropylene: (product of Nippon Polychem Co., Ltd., product name: EA9, density of 0.91, MFR (melt flow rate)=0.5)
   (2) Polyethylene: (product of Nippon Polychem Co., Ltd., product name: HB530, density of 0.96, MFR=0.5)
   (3) Polyethylene: (product of Nippon Polychem Co., Ltd., product name: UE320, density of 0.92, MFR=0.7)
   (4) Polyvinyl butyral: (product of Sekisui Chemical Co., Ltd., product name: BH-5, glass transition temperature of 65° C.)

(f) Acid-Modified Polyolefin Resin

For the increased affinity between the thermoplastic resin and the layered silicate and also for comparison with conventional cases, the following acid-modified polyolefin resins were used.
   (1) Maleic anhydride modified polypropylene oligomer: (product of Sanyo Chemical Industries, Ltd., product name: U-mex 1001, functional group content=0.23 mmol/g)
   (2) Maleic anhydride modified polyethylene oligomer: (product of Sanyo Chem. Ind., Ltd., product name: U-mex 2000, functional group content=0.92 mmol/g)

EXAMPLES 1–14 AND COMPARATIVE EXAMPLES 1–6

The materials used in Examples 1–14 and Comparative Examples 1–6 are specified in Table 1.

1) Preparation of Sample Foams

A thermoplastic resin and a layered silicate in the weight ratio specified in Table 1 were supplied to an interior of a Labo Plastomill, manufactured by Toyo Seiki Ltd., in which they were melt kneaded at a temperature set at 170° C. As specified in Table 1, the layered silicate was selected from those described above as either excluding or containing a cationic surfactant. In Examples 5–10 and 12 and Comparative Examples 2 and 3, the above-described acid-modified polyolefin resin was further added in the proportion specified in Table 1, based on 100 parts by weight of the thermoplastic resin, for the purpose of improving an affinity between the thermoplastic resin and the layered silicate.

The resulting composite composition was preheated in a melt press at 170° C. for 5 minutes and then pressed at a pressure of 9.8 MPa for 1 minute to provide a 1 mm thick sheet.

A 3 cm square piece was cut out from the sheet and placed in an closed autoclave. An interior temperature of the autoclave was controlled at a temperature 10° C. higher than a melting point or glass transition point of the thermoplastic resin. Subsequently, a pressurized carbonic acid gas, nitrogen or water vapor was introduced into the autoclave. The interior pressure of the autoclave was kept at 1.67 MPa for 30 minutes. Then, the interior temperature of the autoclave was set at a level 10° C. lower than the melting or glass transition point of the thermoplastic resin. In this condition, the gas present in the autoclave was rapidly discharged therefrom to return the interior pressure of the autoclave to an ordinary pressure. This resulted in obtaining sample foams.

EXAMPLES 15–24 AND COMPARATIVE EXAMPLE 9

(1) Preparation of Intercalation Compound Containing a Heat Decomposable Blowing Agent in its Interlayer Spaces 20 g of Hojun Kogyo montmorillonite or Corp Chemical swelling mica was incorporated in 1 L distilled water. A stirring motor was operated to effect stirring of the mixture at ordinary temperature for 1 hour to obtain a dispersed slurry. 40 g of azodicarbonamide or benzene sulfonyl hydrazide, as a heat decomposable blowing agent, was added to the dispersed slurry which was subsequently stirred at ordinary temperature for 30 minutes by the stirring motor. 8 g of distearyl dimethyl ammonium chloride was further added to the slurry which was then stirred at ordinary temperature for 1 hour by the stirring motor. The resulting slurry was subjected to centrifugal solid-liquid separation. The subsequent vacuum drying at 60° C. for 24 hours resulted in obtaining an intercalation compound containing the heat decomposable blowing agent between its layers.

The thermoplastic resin and the layered silicate specified in type in Table 1 were supplied in the weight proportion also specified in Table 3 to an interior of a Labo Plastomill, manufactured by Toyo Seiki Ltd., in which they were melt kneaded at a temperature set at 170° C. In Examples 15–24, montmorillonite or swelling mica which contains azodicarbonamide between layers was used.

In Examples 19–23 and Comparative Examples 8 and 9, the acid-modified polyolefin resin was further added in the proportion specified in Table3, based on 100 parts by weight of the thermoplastic resin, for the purpose of improving an affinity between the thermoplastic resin and the layered silicate.

The resulting composite composition was preheated in a melt press at 170° C. for 5 minutes and then pressed at a pressure of 9.8 MPa for 1 minute to provide a 1 mm thick sheet. This sheet was immersed in a hot silicone oil kept at 200° C. for 10 seconds to obtain a foam.

COMPARATIVE EXAMPLES 7, 8, 10 AND 11

The thermoplastic resin and layered silicate containing no heat decomposable blowing agent between layers were supplied in the weight ratio specified in Table 3 to an interior of a Labo Plastomill, manufactured by Toyo Seiki Ltd., in which they were melt kneaded at a temperature set at 200° C. In Comparative Example 8, 5 parts by weight of the acid-modified polyolefin was also added, based on 100 parts by weight of the thermoplastic resin, to increase an affinity between the thermoplastic resin and the layered silicate.

In Comparative Examples 7, 8, 10 and 11, the composite composition containing the ingredients specified in Table 2 and obtained in the manner as described above was pelletized and then supplied, together with the heat decomposable blowing agent specified in Table 2, to an interior of a Labo Plastomill, manufactured by Toyo Seiki Ltd., in which they were subjected to 3-minute melt kneading. The resulting composite material was preheated in a melt press at 180° C. for 2 minutes and then pressed at a pressure of 9.8 MPa for 1 minute to provide a 1 mm thick sheet. This sheet was immersed in a hot silicone oil kept at 200° C. for 10 seconds to obtain a foam.

COMPARATIVE EXAMPLE 12

Composition disclosed in Japanese Patent Laying-Open No. Hei 9-183910

(Composite Material of a Solvent-Swollen Layered Silicate and a Thermoplastic Resin)

The following compositions were used for the composite composition of a solvent-swollen layered silicate and a thermoplastic resin. 500 g of DSDM-modified montmorillonite manufactured by Hojun Kogyo Co., Ltd. (product name: New S-Ben D) was added to 5 L xylene (product of Wako Pure Chem. Ind., Ltd.). Using a motor-driven stirrer, the mixture was stirred at ordinary temperature for 2 hours to provide a slurry. Polypropylene (product of Nippon Polychem Co., Ltd., product name: EA9, density of 0.91, MFR=0.5) was extruded at an extrusion temperature of 200° C. by a melt extruder. Concurrently, the slurry was introduced from a liquid delivery nozzle disposed along the extrusion line and the xylene was suctioned from a vent port located downstream of the liquid delivery nozzle along the extrusion line. The composite material was extruded from a sheet die attached to a front end of the extruder into a 1 mm thick sheet serving as a sample for subsequent evaluation.

COMPARATIVE EXAMPLE 13

Composition disclosed in Japanese Patent Laying-Open No. Hei 10-182892

(Composite Material of a Layered Silicate, a Thermoplastic Resin and an Acid-Modified Oligomer)

A polypropylene resin (product of Nippon Polychem Co., Ltd., product name: EA9, density of 0.91, MFR=1.5), a Hojun Kogyo DSDM-modified montmorillonite (product name: New S-Ben D) and a maleic anhydride modified polypropylene oligomer (product of Sanyo Chem. Ind., Ltd., product name: U-mex 1001, functional group content=0.23 mmol/g) in the weight ratio of 80/5/15 were fed into a Toyo Seiki Labo Plastomill in which they were melt kneaded at a temperature set at 200° C. The resulting composite composition was preheated in a melt press at 200° C. for 5 minutes and then pressed at a pressure of 9.8 MPa for 1 minute to provide a 1 mm thick sheet serving as a sample for evaluation.

COMPARATIVE EXAMPLE 14

Composition disclosed in Japanese Patent Laying-Open No. Hei 8-143697

80 g of Hojun Kogyo montmorillonite (product name: Ben-Gel A), 80 g of 5-amino-1H-tetrazole (HAT), 40 g of vinyltriethoxysilane (Vsi), 2 L of methyl alcohol and 0.1 L of water were charged into a 3 L round flask. The flask contents were stirred at 60° C. for 24 hours using a motor-driven stirrer, fluxed and passed through a filter paper to collect a filter cake. This filter cake was vacuum dried at 50° C. for 24 hours by a vacuum drier to obtain a composition for use as a layered silicate incorporating a blowing agent adsorbed thereto. A sum of proportions of the blowing agent and silane coupling agent that respectively adsorbed to the layered silicate was 45.3%. The above-obtained composition and a polypropylene resin (product of Nippon Polychem Co., Ltd., product name: EA9, density of 0.91, MFR=0.5) were melt kneaded in a Toyo Seiki Labo Plastomill at 160° C. The resulting composition was further immersed in a hot silicone oil kept at 180° C. to thereby obtain a sample foam.

(Sample Evaluation Method)

1) Interlayer Spacing of Layered Silicate

An X-ray diffractometer (product of Rigaku Co., Ltd., product name: RINT-1100) was used to measure a diffraction peak 2θ for layered planes of the layered silicate in the composite material. An interplanar spacing between the flaky crystals of the layered silicate was calculated from the following Bragg diffraction equation.

$$\lambda = 2d \sin \theta \quad (1)$$

(where, $\lambda=1.54$, d is an interplanar spacing of the layered silicate, and θ is a diffracted angle.)

The value of d, as derived from the equation (1), was taken as a value for an interlayer spacing.

2) Expansion Ratio

An expansion ratio of the foam was calculated from the following equation (2) wherein a density of the foam was calculated from a buoyant force exerted thereon by water in which it was submerged.

$$\text{Expansion ratio} = \text{density before expansion/density after expansion} \quad (2)$$

3) Foam Cell Diameter

A secondary electron reflection type electron microscope (product of JOEL Ltd., product name: JSM-5800LV) was utilized to observe the foam. 50 foam cells were observed for cell diameter and an arithmetic mean thereof was taken as a foam cell diameter of the foam.

(Results)

Evaluation results, i.e., an interplanar spacing of the layered silicate, expansion ratio and foam cell diameter, for each of the foams obtained in Examples and Comparative Examples are shown in Tables 2 and 4.

In Examples 1–24, expansion of the chemical substance impregnated in the composite material containing the layered silicate resulted in obtaining foams having a high expansion ratio and a uniform cell diameter. Also, either foam has a foam cell diameter within the range of 10–75 μm, which value is very small for a high expansion-ratio foam.

In contrast, in Comparative Examples 1, 2, 4 and 5, the impregnation of the gaseous substance or supercritical fluid into the thermoplastic resin did not lead to high expansion ratios.

For the foams obtained in Examples 1–24, the X-ray diffractometry revealed no diffraction corresponding to the interlayer spacing. 2θ=1.5, i.e., the interlayer spacing of 60

Å is the detection limit of the X-ray diffractometer used for the measurement. Thus, the X-ray diffractometer is incapable of detecting the interlayer spacing if over 60 Å. From the nature of the measurement, any diffraction must be obtained if the interlayer spacing is 60 Å. It follows that the layered silicates in the foams obtained in Examples 1–24 all have the interlayer spacings over 60 Å.

As demonstrated by Comparative Example 3, if the amount of the layered silicate is excessively large, i.e., if the amount of the layered silicate exceeds 50 parts by weight, relative to 100 parts by weight of the thermoplastic resin, the interlayer spacing is not caused to enlarge. This is considered due to the barrier action of the layered silicate that suppressed diffusion of the gas to an excessive extent.

The utilization of the technique disclosed either in Comparative Example 12 (Japanese Patent Laying-Open No. Hei 9-183910) or Comparative Example 13 (Japanese Patent Laying-Open No. Hei 10-182892) resulted in the failure to increase the interlayer spacing to over 60 Å. However, according to Examples 1–24, the interlayer spacing of over 60 Å was attained without failure.

Comparative Example 14 (Japanese Patent Laying-Open No. Hei 8-143697), while possible to provide a high expansion ratio, provided an average interlayer spacing of 28 Å and a very large foam cell diameter of 402 μm. This is considered due to the uneven dispersion of the layered silicate that led to the insufficient suppression of diffusion of the gas.

TABLE 1

| | | Layered Silicate A | Thermoplastic Resin B | Acid-modified Polymer C | Blending Proportions (A/B/C) | Gaseous Substance |
|---|---|---|---|---|---|---|
| Ex. | 1 | DSDM-modified Montmorillonite | EA9 | — | 1/99/0 | Carbon Dioxide Gas |
| | 2 | DSDM-modified Montmorillonite | EA9 | — | 5/95/0 | Carbon Dioxide Gas |
| | 3 | DSDM-modified Montmorillonite | EA9 | — | 30/70/0 | Carbon Dioxide Gas |
| | 4 | DSDM-modified Swelling Mica | EA9 | — | 5/95/0 | Carbon Dioxide Gas |
| | 5 | Montmorillonite | EA9 | U-mex 1001 | 5/90/5 | Carbon Dioxide Gas |
| | 6 | Swelling Mica | EA9 | U-mex 1001 | 5/90/5 | Carbon Dioxide Gas |
| | 7 | DSDM-modified Montmorillonite | EA9 | U-mex 1001 | 5/90/5 | Carbon Dioxide Gas |
| | 8 | DSDM-modified Swelling Mica | EA9 | U-mex 1001 | 5/90/5 | Carbon Dioxide Gas |
| | 9 | DSDM-modified Montmorillonite | HB530 | U-mex 2000 | 5/90/5 | Carbon Dioxide Gas |
| | 10 | DSDM-modified Montmorillonite | EA9 | U-mex 1001 | 5/90/5 | Nitrogen Gas |
| | 11 | DSDM-modified Montmorillonite | BH-5 | — | 5/95/0 | Carbon Dioxide Gas |
| | 12 | DSDM-modified Montmorillonite | HB530 | — | 1/99/0 | Carbon Dioxide Gas |
| | 13 | DSDM-modified Montmorillonite | UE320 | U-mex 2000 | 5/95/0 | Carbon Dioxide Gas |
| | 14 | Mica | EA9 | U-mex 1001 | 5/90/5 | Water Vapor |
| Comp. Ex. | 1 | — | EA9 | — | 0/100/0 | Carbon Dioxide Gas |
| | 2 | — | EA9 | U-mex 1001 | 0/95/5 | Carbon Dioxide Gas |
| | 3 | DSDM-modified Montmorillonite | EA9 | U-mex 1001 | 55/35/10 | Carbon Dioxide Gas |
| | 4 | — | HB530 | — | 0/100/0 | Carbon Dioxide Gas |
| | 5 | — | BH-5 | — | 0/100/0 | Carbon Dioxide Gas |
| | 6 | — | UE320 | — | 0/100/0 | Carbon Dioxide Gas |

TABLE 2

|   |   | Average Interlayer Spacing of Layered Silicate (Å) | Expansion Ratio | Foam Cell Diameter (μm) |
|---|---|---|---|---|
| Ex. | 1 | Over 60 Å | 6.5 | 49 |
|  | 2 | Over 60 Å | 11.7 | 54 |
|  | 3 | Over 60 Å | 12.3 | 39 |
|  | 4 | Over 60 Å | 14.1 | 59 |
|  | 5 | Over 60 Å | 16.6 | 72 |
|  | 6 | Over 60 Å | 20.1 | 67 |
|  | 7 | Over 60 Å | 25.4 | 59 |
|  | 8 | Over 60 Å | 28.2 | 65 |
|  | 9 | Over 60 Å | 15.9 | 50 |
|  | 10 | Over 60 Å | 14.2 | 53 |
|  | 11 | Over 60 Å | 16.3 | 12 |
|  | 12 | Over 60 Å | 6.5 | 49 |
|  | 13 | Over 60 Å | 16.4 | 65 |
|  | 14 | Over 60 Å | 6.5 | 80 |
| Comp. Ex. | 1 | — | 0.8 | Nonuniform |
|  | 2 | — | 1.9 | Nonuniform |
|  | 3 | 28 Å | 10.6 | 44 |
|  | 4 | — | 1.8 | Nonuniform |
|  | 5 | — | 3.2 | Nonuniform |
|  | 6 | — | 1.9 | Nonuniform |

TABLE 3

|  |  | Layered Silicate A | Thermoplastic Resin B | Acid-modified Polymer C | Blowing Agent D | Blending Proportions (A/B/C/D) |
|---|---|---|---|---|---|---|
| Ex. | 15 | Montmorillonite Containing Azodicarbonamide Between Its Layers | HB530 | — |  | 1/99/0/0 |
|  | 16 | Montmorillonite Containing Azodicarbonamide Between Its Layers | EA9 | — |  | 5/95/0/0 |
|  | 17 | Montmorillonite Containing Azodicarbonamide Between Its Layers | EA9 | — |  | 30/70/0/0 |
|  | 18 | Swelling Mica Containing Azodicarbonamide Between Its Layers | EA9 | — |  | 5/95/0/0 |
|  | 19 | Montmorillonite Containing Azodicarbonamide Between Its Layers | EA9 | U-mex 1001 |  | 5/90/5/0 |
|  | 20 | Swelling Mica Containing Azodicarbonamide Between Its Layers | EA9 | U-mex 1001 |  | 5/90/5/0 |
|  | 21 | Montmorillonite Containing Azodicarbonamide Between Its Layers | EA9 | U-mex 1001 |  | 5/90/5/0 |
|  | 22 | Montmorillonite Containing Azodicarbonamide Between Its Layers | HB530 | U-mex 2000 |  | 5/90/5/0 |
|  | 23 | Montmorillonite Containing Benzene Sulfonyl Hydrazide Between Its Layers | EA9 | U-mex 1001 |  | 5/90/5/0 |
|  | 24 | Montmorillonite Containing Azodicarbonamide Between Its Layers | BH-5 | — |  | 5/95/0/0 |
| Comp. Ex. | 7 | — | EA9 | — |  | 0/100/0/5 |
|  | 8 | — | EA9 | U-mex 1001 |  | 0/95/5/5 |
|  | 9 | DSDM-modified Montmorillonite | EA9 | U-mex 1001 |  | 55/35/10/5 |

TABLE 3-continued

| | Layered Silicate A | Thermoplastic Resin B | Acid-modified Polymer C | Blowing Agent D | Blending Proportions (A/B/C/D) |
|---|---|---|---|---|---|
| | 10 | — | HB530 | — | 0/100/0/5 |
| | 11 | — | BH-5 | — | 0/100/0/5 |
| | 12 | | | | |
| | 13 | | | | |
| | 14 | | | | |

TABLE 4

| | | Average Interlayer Spacing of Layered Silicate (Å) | Expansion Ratio | Foam Cell Diameter (μm) |
|---|---|---|---|---|
| Ex. | 15 | Over 60 Å | 5.5 | 72 |
| | 16 | Over 60 Å | 10.8 | 96 |
| | 17 | Over 60 Å | 11.4 | 54 |
| | 18 | Over 60 Å | 13.2 | 89 |
| | 19 | Over 60 Å | 15.6 | 111 |
| | 20 | Over 60 Å | 19.1 | 102 |
| | 21 | Over 60 Å | 23.2 | 92 |
| | 22 | Over 60 Å | 24.2 | 80 |
| | 23 | Over 60 Å | 23.2 | 80 |
| | 24 | Over 60 Å | 19.2 | 50 |
| Comp. Ex. | 7 | — | 11.2 | 321 |
| | 8 | — | 12.3 | 481 |
| | 9 | 28 Å | 20.4 | 859 |
| | 10 | — | 10.5 | 483 |
| | 11 | — | 9.8 | 200 |
| | 12 | 26 Å | — | — |
| | 13 | 24 Å | — | — |
| | 14 | 28 Å | 22.8 | 402 |

EXAMPLE 25 AND COMPARATIVE EXAMPLES 15 AND 16

(Raw Material)

The raw material used in the present invention is below described.

Layered Silicate

The following minerals were used for the layered silicate.

Talc (product of Tokuyama Co., Ltd., product name: T68MMR, talc particle diameter of about 5 μm, pellets containing 70% talc)

Montmorillonite (product of Hojun Kogyo Co., Ltd., product name: Bengel-A)

Layered Silicate Containing a Cationic Surfactant

The following material was used for the layered silicate containing a cationic surfactant.

DSDM-modified swelling mica (product of Corp Chemical Co., Ltd., product name: MAE-100=organically-modified swelling mica prepared via total ion-exchange of sodium ions present in interlayer spaces of montmorillonite by distearyl dimethyl ammonium chloride)

Thermoplastic Resin Composition

The following compositions were used for the thermoplastic resin.

Random polypropylene (product of Himont Corp., product name: SR256M, density of 0.91, MFR=2.0)

Linear low-density polyethylene (product of Idemitsu Petrochemical Co., Ltd., product name: Moretech 0238CN, density of 0.916, MFR=2.0)

Polypropylene (product of Nippon Polychem Co., Ltd., product name: EA9, density of 0.91, MFR=0.5)

Acid-Modified Polyolefin Resin

For the increased affinity between the theremoplastic resin and the layered silicate and also for comparison with prior art, the following composition was used.

Maleic anhydride modified polypropylene oligomer (product of Sanyo Chemical Industries, Ltd., product name: U-mex 1001, functional group content=0.23 mmol/g)

Crosslinking Aid

The following reagent was used to promote crosslinking by ionizing radiation.

Trimethylolpropane triacrylate (product of Aldrich Co.)

Heat Decomposable Blowing Agent

The following reagent was used as the heat decomposable blowing agent.

Azodicarbonamide (product of Otsuka Chemical Co., Ltd., product name: Unifoam AZ-HM)

EXAMPLES AND COMPARATIVE EXAMPLES FOR PREPARATION OF EVALUATION SAMPLES

EXAMPLE 25

The random propylene SR256M and linear low-density polyethylene 0238CN in the ratio of 8:2 was mixed in a Toyo Seiki Labo Plastomill for use as a thermoplastic resin. 5 parts by weight of the DSDM-modified swelling mica MAE-100 and 100 parts by weight of the thermoplastic resin were melt kneaded at a temperature set at 170° C. In order to improve an affinity between the thermoplastic resin and layered silicate, the maleic anhydride modified polypropylene U-mex 1001 was also added in the amount of 5 parts by weight per 100 parts thermoplastic resin.

Melt kneading was continued while 3 parts by weight of trimethylolpropane triactylate as a crosslinking agent and 12 parts by weight of azodicarbonamide Unifoam AZ-HM, each based on 100 parts by weight of the thermoplastic resin, were further added.

The resulting composite composition was pressed using a hand press at 180° C. for 3 minutes into a 1 mm thick sheet. This sheet was then exposed to 10 Mrads of an electron beam accelerated at a voltage of 750 kV to effect crosslinking. The irradiated sheet was subsequently allowed to expand in a gear oven at 260° C. to obtain an evaluation sample.

COMPARATIVE EXAMPLE 15

The procedure of Example 1 was followed, except that DSDM-modified swelling mica and maleic anhydride modified polypropylene were unloaded, to obtain an evaluation sample.

COMPARATIVE EXAMPLE 16

The procedure of Example 1 was followed, except that talc, generally used as an inorganic filler, was loaded in the amount of 5 parts by weight per 100 parts by weight of the thermoplastic resin, instead of loading DSDM-modified swelling mica, and maleic anhydride modified polypropylene was unloaded, to obtain an evaluation sample.

(Sample Evaluation Method)

The above-obtained evaluation samples were evaluated in the same manner as in Example 1. The results are given in the following Table 5.

TABLE 5

|  | Ex. 25 | Comp. Ex. 15 | Comp. Ex. 16 | Comp. Ex. 13 |
|---|---|---|---|---|
| Form | Foam | Foam | Foam | Sheet |
| Inorganic Filler | DSDM-modified Montmorillonite | — | Talc | DSDM-modified Montmorillonite |
| Dosage (Mrad) | 10 | 10 | 10 | — |
| Interlayer Spacing (Å) | >60 | — | — | 24 |
| Expansion Ratio | 27.8 | 22.9 | 18.1 | — |
| Foam Cell Diameter (µm) | 120 | 250 | 950 | — |

EXAMPLE 26

The same raw material as in Example 4 was used, except that the chemical substance was changed from carbon dioxide to pentane assuming a liquid form at ordinary temperature, to produce a foam. In the production of the foam, pentane was introduced into an autoclave whose interior pressure was subsequently increased to and maintained at 5.88 MPa for 30 minutes. Then, an interior temperature of the autoclave was set at a level 10° C. lower than the melting point of the thermoplastic resin (EA9) used. In this condition, the gas present in the autoclave was rapidly discharged therefrom to return the interior pressure of the autoclave to an ordinary pressure. The resulting foam was evaluated in the same manner as in Example 1. The average interlayer spacing of the layered silicate, expansion ratio and foam cell diameter were found to be over 60 Å, 13.2 and 95 µm, respectively.

EXAMPLE 27

Figure 8:
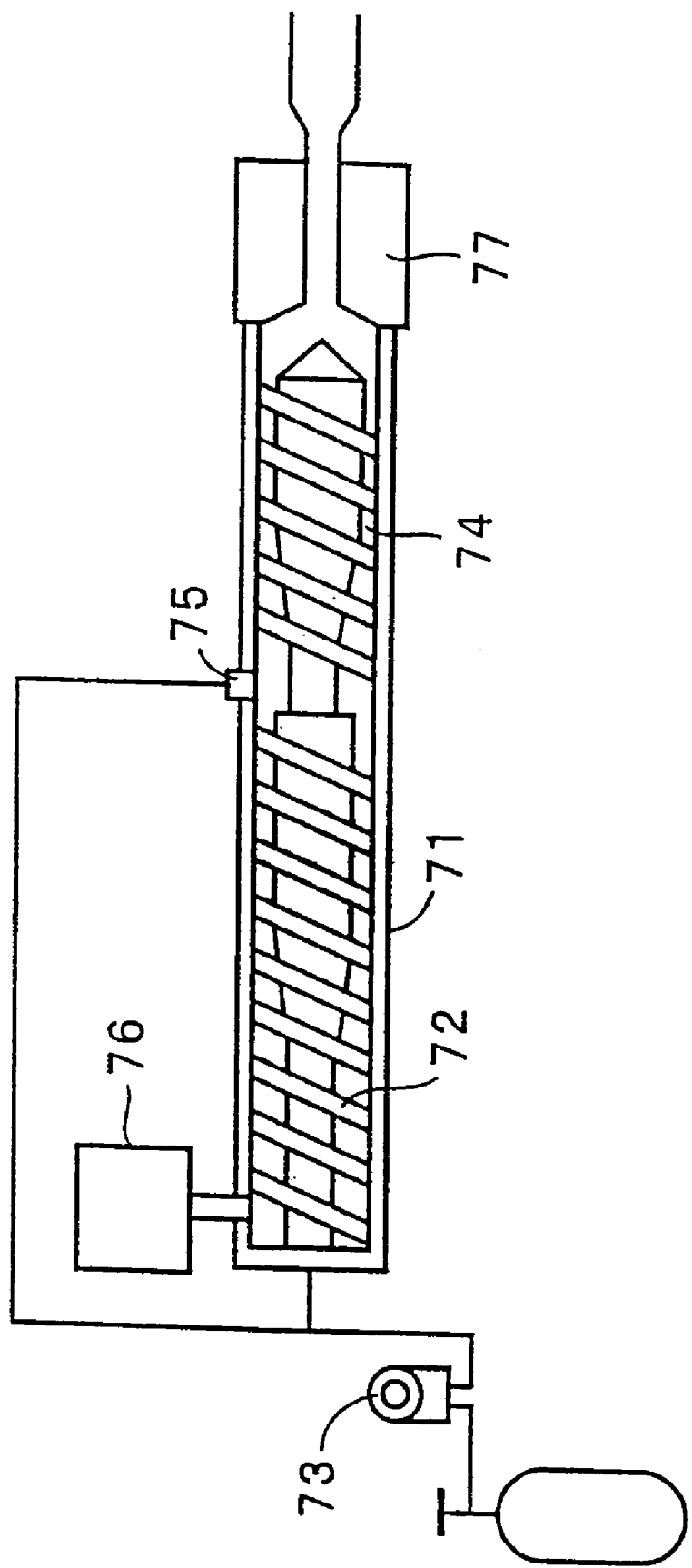
FIG. 8 is a schematic constitutional view given to explain an extruder for use in the present invention.

The same raw material as in Example 5 was extruded using a processing machine shown in FIG. 8 to produce a foam. That is, the thermoplastic resin composition was supplied to a single-screw extruder 71 (including a screw 72 with a diameter of 40 mm and a length/diameter ratio of 30) through a pressure-resistant hopper 76 in the processing machine shown in FIG. 8. A pressure pump 73 was used to force, in the form of carbon dioxide under a pressure of 7.84 MPa, the chemical substance into a gas inlet port 75 located along a liquid transport portion 74. The carbon dioxide under such a pressure was allowed to dissove in the theremoplastic resin composition in an amount of about 9% by weight.

In this instance, a high-pressure sealing mechanism of a screw shaft, a pressure-resistant structure of the hopper and the molten thermoplastic resin composition residing near the extruder served to maintain the carbon dioxide inside the extruder in a dwell condition. The thermoplastic resin composition fed to the extruder 71 was then melt kneaded therein sufficiently under the following conditions; an output rate of 2 kg/hour, a screw revolution speed of 10 rpm and a cylinder temperature of 200° C. Subsequently, the thermoplastic resin composition was passed through a front end of a die 77 kept at a temperature of about 120° C. The resin was extruded from the die 77 into a rod shape to produce a foam. This foam was evaluated in the same manner as in Example 1. As a result, the interlayer spacing of the layered silicate, expansion ratio and foam cell diameter were found to be over 60 Å, 13.2 and 95 µm, respectively.

EXAMPLES 28–35

Figure 7:
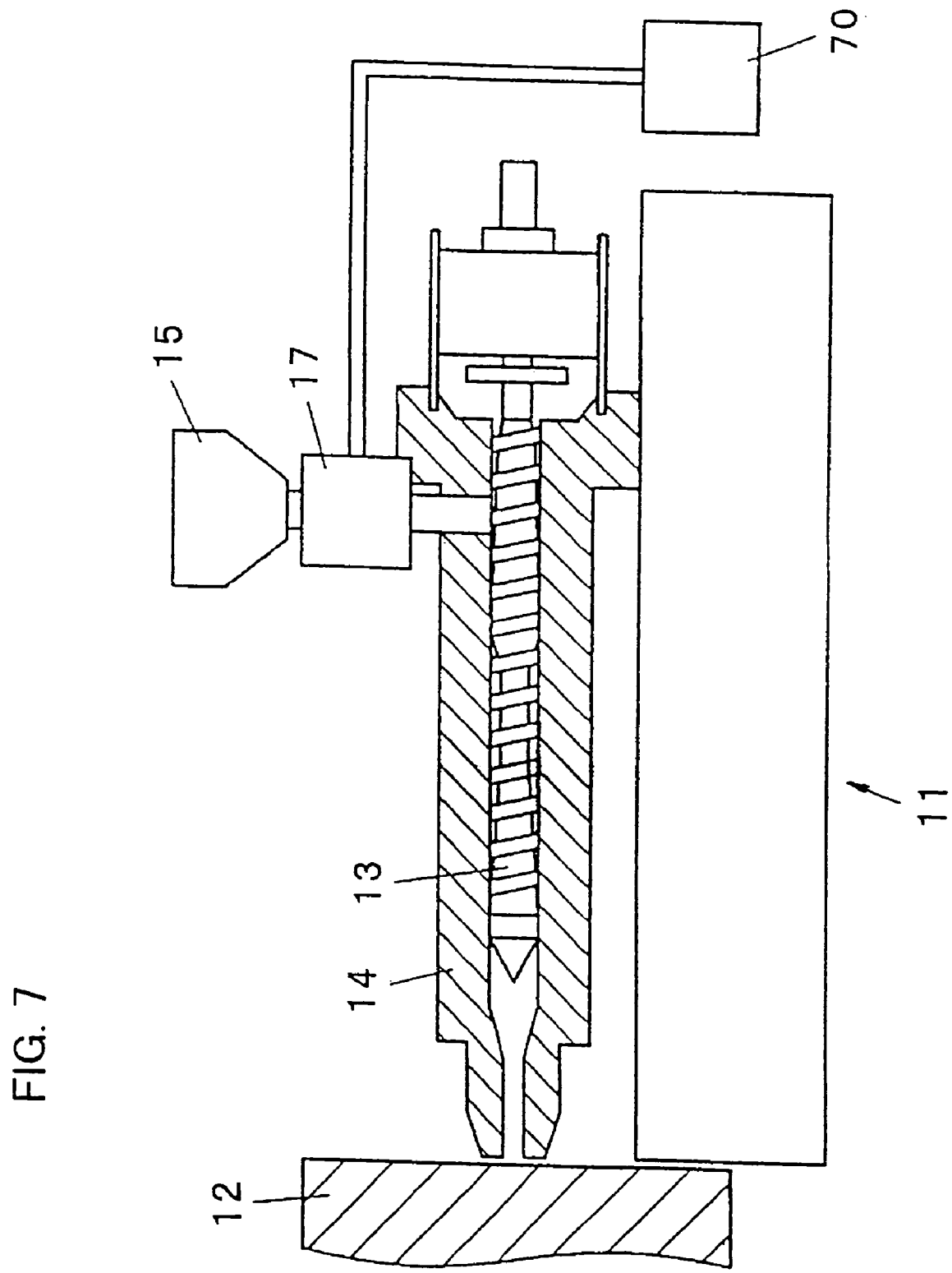
FIG. 7 is a sectional view which shows an injection molding machine for use in another embodiment of the present invention.

Polypropylene (product of Nippon Polychem Co., Ltd., product under designation of "EA9", density of 0.91 g/cm$^3$ MFR=0.5 g/10 minutes), polyvinyl butyral (product of Sekisui Chemical Co., Ltd., product under designation of "BH-5", glass transition temperature of 65° C.), montmorillonite prepared via total ion-exchange of sodium ions present between layers by distearyl dimethyl ammonium chloride (product of Hojun Kogyo Co., Ltd., product name "New S-Ben D", denoted in Table 6 as DSDM-modified montmorillonite), swelling mica prepared via total ion-exchange of sodium ions present between layers by distearyl dimethyl ammonium chloride (product of Corp Chemical Co., Ltd., product under designation of "MAE", denoted in Table 6 as DSDM-modified mica), montmorillonite (product of Hojun Kogyo Co., Ltd., product name "Bengel A"), swelling mica (product of Corp Chemical Co., Ltd., product under designation of "ME-100"), maleic anhydride modified polypropylene oligomer (product of Sanyo Chemical Industries, Ltd., product name "U-mex 1001", functional group content=0.23 mmol/g), respectively in the amounts specified in Table 6, were fed to the hopper 15 of the injection molding machine shown in FIG. 7.

Figure 6:
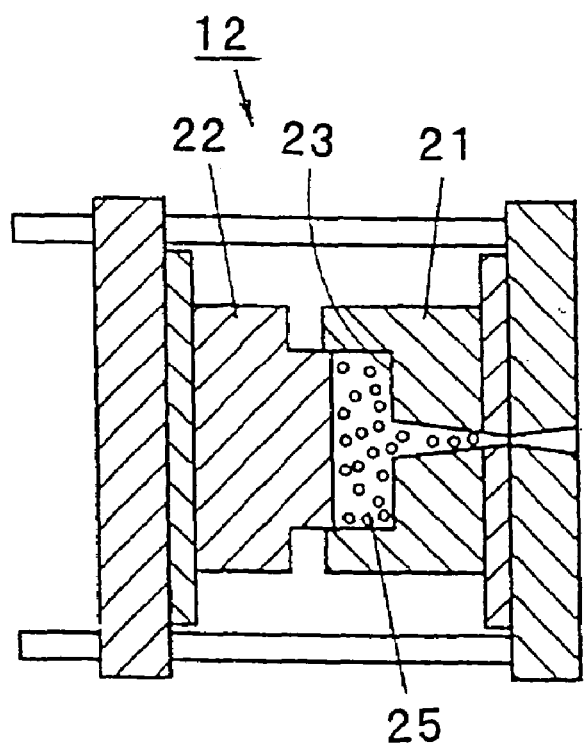
FIG. 6 is a sectional view of an injection mold shown in FIG. 5, in the condition of being enlarged.

Meanwhile, a carbon dioxide ($CO_2$) or nitrogen ($N_2$) gas was delivered from the gas forcing device 70 to the closed container 17, and impregnated under an atmosphere of 10 MPa and 60° C. (in the case of $CO_2$, in a supercritical condition and in the case of $N_2$, in a highly pressurized-condition) into the thermoplastic resin composition fed to an interior of the hopper 15. The gas-impregnated composition was then introduced into the cylinder 14 controlled at a temperature of 250° C., in which it was melt kneaded and metered by the screw at a revolution speed of 50 rpm. The melt was then injected at a rate of 100 mm/sec into a disc-shaped cavity having a diameter of 250 mm and a width of 3 mm and dwelled for 20 seconds. Thereafter, the cavity 23 was enlarged in the fashion as shown in FIG. 6, to a width of 45 mm at 1 second and then cooled for 30 seconds to obtain a foam.

The foams obtained in Examples 28–35 were evaluated in the same manner as in Example 1 and also evaluated for thermal conductivity according to the procedure described below. The results are given in the following Table 6. In Table 6, the evaluation results of the preceding Comparative Example 14 are also given for a comparative purpose.

(Thermal Conductivity)

The obtained foams were evaluated for thermal conductivity by a thermal conductivity meter (product of Eiko Seiki Co., Ltd., model type "HC-072") with a hot plate set at 50° C. and a cool plate set at 20° C.

TABLE 6

| | | | Example | | | | | | | | Comp. Ex. 14 |
|---|---|---|---|---|---|---|---|---|---|---|---|
| | | | 28 | 29 | 30 | 31 | 32 | 33 | 34 | 35 | |
| Composition (Parts by Weight) | Thermoplastic Resin | Polypropylene | 100 | 100 | 95 | 95 | 95 | 95 | 95 | — | Followed Japanese Patent Laying-Open No. Hei 8-143697 |
| | | Polyvinyl Butyral | — | — | — | — | — | — | — | 100 | |
| | Layered Silicate | DSDM-modified Montmorillonite | 43 | — | — | — | 5 | — | 5 | — | |
| | | DSDM-modified Swelling Mica | — | 5 | — | — | — | 5 | — | 5 | |
| | | Montmorillonite | — | — | 5 | — | — | — | — | — | |
| | | Swelling Mica | — | — | — | 5 | — | — | — | — | |
| | Acid-modified Polypropylene Oligomer | | — | — | 5 | 5 | 5 | 5 | 5 | — | |
| | Chemical Substance | | $CO_2$ | $CO_2$ | $CO_2$ | $CO_2$ | $CO_2$ | $CO_2$ | $N_2$ | $CO_2$ | |
| Evaluation Results | Average Interlayer Spacing (Å) | | >60 | >60 | >60 | >60 | >60 | >60 | >60 | >60 | 28 |
| | Foam Cell Diameter (μm) | | 39 | 59 | 72 | 67 | 59 | 65 | 53 | 12 | 300 |
| | Thermal Conductivity [W/(m·k)] | | 0.071 | 0.065 | 0.065 | 0.055 | 0.054 | 0.048 | 0.057 | 0.061 | 0.098 |

As a result of evaluation, all of the foams obtained in Examples 28–35 were found to exhibit average interlayer spacings of over 60 Å, the detection limit of the X-ray diffractometer used, have uniform and fine foam cells with cell diameters in the range of 12–72 μm, and show good heat insulation performances, i.e., thermal conductivities in the range of 0.054–0.071 W/(m·K). In contrast, the foam obtained in Comparative Example 14 was found to exhibit a narrow average interlayer spacing of 28 Å, have a very large foam cell diameter of 300 μm, and show a high thermal conductivity of 0.098 W/(m·K).

Effects of the Invention

As stated above, the thermoplastic foam in accordance with the present invention contains 100 parts by weight of a thermoplastic resin and 0.1–50 parts by weight of a layered silicate which has an average interlayer spacing of over 60° C. when determined by an X-ray diffractometry. This constitution assures enhanced dispersion of flaky crystals of the layered silicate in the foam. Thus, the properties expected for the foam by addition of a layered silicate, e.g., heat resistance, flame retardance and dimensional stability, can be further enhanced by the even dispersion of the flaky crystals of the layered silicate.

Also, in the foam production, such flaky crystals of the layered silicate act as gas barriers during formation of a foam cell structure. This results in the provision of a foam which has uniform and fine foam cells evenly dispersed therein and thus has elasticity or other properties uniform throughout the foam.

The properties of the foam, such as heat insulation performance, compressive strength and bending creep, may drop if $X/(Y-1)^{1/3}$ exceeds 30 μm, where X is an average cell diameter (μm) and Y is an expansion ratio.

In the present invention, a polyolefin resin can be used for the aforementioned thermoplastic resin. In such a case, a polyolefin foam can be provided having improved properties as a result of even dispersion of the layered silicate.

At least one selected from swelling smectite clay minerals and swelling micas can be suitbaly used for the layered silicate. If this is the case, a cell diameter can be further reduced by the increased dispersion of such a mineral and its action to serve as a nucleating agent during cell formation. The increased mechanical strength also results.

In the production method of a thermoplastic foam in accordance with the present invention, a volume-expansible chemical substance is impregnated into interlayer spaces of a layered silicate in a composite material containing 100 parts by weight of a thermoplastic resin and 0.1–50 parts by weight of the layered silicate and the chemical substance is allowed to expand in volume in the composite material so that a cellular structure is formed. In this instance, the flaky crystals of the layered silicate serves as barriers against expansion in volume of the chemical substance. This prevents excessive release or localized nonuniform expansion of the gaseous chemical substance and allows even dispersion of the flaky crystals of the layered silicate and thus even distribution of foam cells. Accordingly, a thermoplastic foam excellent in properties, such as strength and heat resistance, can be readily provided. Also, because the method does not use a solvent, a troublesome process for removing a residual solvent is not required.

In the case where a composite material is prepared containing 100 parts by weight of a thermoplastic resin and 0.1–50 parts by weight of a layered silicate incorporating a heat decomposable blowing agent between its layers and the composite material is heated to a temperature sufficiently high to cause decomposition of the blowing agent so that a cellular structure is formed, the flaky crystals of the layered silicate act as barriers against a gas produced via thermal decomposition of the blowing agent. In the similar manner, this allows even dispersion of the flaky crystals of the layered silicate and thus even distribution of fine foam cells. Accordingly, a thermoplastic foam can be provided which has improved mechanical strength or other properties uniform throughout the foam as a result of even dispersion of the layered silicate therein.

Also in the method wherein a chemical substance that assumes a gaseous form at ordinary temperature and pressure is impregnated under a high pressure into a thermoplastic resin composition containing 100 parts by weight of a thermoplastic resin and 0.1–50 parts by weight of a layered silicate within an injection molding machine having a cavity and, subsequent to injection of the thermoplastic resin composition into the cavity, the cavity is enlarged, the flaky crystals of the layered silicate act as barriers, resulting in ever dispersion of the flaky crystals of the layered silicate and thus even distribution of fine foam cells. Accordingly, a thermoplastic foam can be provided which has improved mechanical strength or other properties uniform throughout the foam as a result of even dispersion of the layered silicate therein. Dispersion of the layered silicate can be achieved more effectively particular when the chemical substance while in its suprecritical state is impregnated into the composition.

Also in the present invention, an increase in heat deformaion temperature due to restriction of molecular chains is expected to result. The effect of suppressing diffusion of a combustion gas and the nucleating effect of the inorganic crystals are also expected. Accordingly, the heat resistance, flame retardance, dimensional stability or other properties of a thermoplastic foam can be markedly improved.

The invention claimed is:

1. A thermoplastic foam comprising, as principle components, 100 parts by weight of a thermoplastic resin and 0.1–50 parts by weight of a layered silicate having an average interlayered spacing of over 60 Å when determined by X-ray diffractometry.

2. The thermoplastic foam as recited in claim 1, wherein $X/(Y-1)^{1/3}$ does not exceed 30 (μm), where X is an average cell diameter and Y is an expansion ratio.

3. The thermoplastic foam as recited in claim 1, wherein said thermoplastic resin is a polyolefin resin.

4. The thermoplastic foam as recited in claim 1, wherein said layered silicate comprises at least one selected from the group consisting of smectite clay minerals and micas.

5. The thermoplastic foam as recited in claim 3, wherein said polyolefin resin is at least one selected from the group consisting of polyethylene, ethylene-α-olefin copolymer, ethylene-propylene copolymer, polypropylene and propylene-α-olefin copolymer.

6. The thermoplastic foam as recited in claim 2, wherein said layered silicate comprises at least one selected from the group consisting of smectite clay minerals and micas.

7. The thermoplastic foam as recited in claim 3, wherein said layered silicate comprises at least one selected from the group consisting of smectite clay minerals and micas.

* * * * *